(12) United States Patent
Toyooka

(10) Patent No.: US 6,597,985 B2
(45) Date of Patent: Jul. 22, 2003

(54) POSITIONING APPARATUS AND NAVIGATION APPARATUS, AND POSITIONING METHOD AND NAVIGATION METHOD

(75) Inventor: Nobuaki Toyooka, Kawagoe (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 10/138,373

(22) Filed: May 6, 2002

(65) Prior Publication Data

US 2002/0169545 A1 Nov. 14, 2002

(30) Foreign Application Priority Data

May 11, 2001 (JP) .................................... P2001-142491
May 11, 2001 (JP) .................................... P2001-142492

(51) Int. Cl.[7] ............................................. B60Q 1/00
(52) U.S. Cl. ...................................... 701/207; 340/988
(58) Field of Search ............................ 701/207, 204, 701/209, 210, 36, 200; 340/988; 73/178 R

(56) References Cited

FOREIGN PATENT DOCUMENTS

EP 1256813 A2 * 11/2002 ............. G01S/1/02

* cited by examiner

Primary Examiner—William A. Cuchlinski, Jr.
Assistant Examiner—Olga Hernandez
(74) Attorney, Agent, or Firm—Sughrue Mion, PLLC

(57) ABSTRACT

There is disclosed a positioning apparatus which measures a current position of a movable body on the basis of a position information indicating a position of said movable body which was measured in the past by the use of a position measuring information transmitted from a positioning satellite. The positioning apparatus comprises a signal processing unit which detects a receiving condition of said position measuring information and a positioning calculating unit which ignores said position information which was obtained in the past when a precision of said position measuring information is decided to be deteriorated on the basis of a threshold value and measures said current position of said movable body by the use of said position measuring information which is received at the present time. The positioning calculating unit also controls said threshold value on the basis of said detected receiving condition.

18 Claims, 5 Drawing Sheets

POSITIONING APPARATUS AND NAVIGATION APPARATUS, AND POSITIONING METHOD AND NAVIGATION METHOD

BACKGROUND OF THE INVENTION

1. Field Pertinent to the Invention

The present invention relates to a technical field of a positioning apparatus and a navigation apparatus, and a positioning method and a navigation method. More particularly, the present invention relates to a positioning apparatus which measures a current position of a vehicle by the use of the position measuring information transmitted from GPS (Global Positioning System) satellite which has been launched in cosmic space and supports movement of the vehicle and a positioning method, and a navigation apparatus including the current positioning apparatus and a navigation method including the current positioning method.

2. Related Background Art

Recently, it has been widely generalized to specify a current position of a movable body such as a vehicle or the like by the use of the position measuring information transmitted from a positioning satellite such as the above described GPS satellite to be used for specifying a position of the movable body on the earth.

According to the above described conventional positioning processing by the use of the position measuring information, specifically, a current position at the present time has been calculated by using both of an estimated position at the present time which is obtained from the current position calculated by the former positioning processing on the base of a predetermined estimation method and a measured position at the present time which is calculated only by using the position measuring information received at the present time. Then, finally, this calculated current position is displayed as a current position of the vehicle, which is calculated by the use of the above described GPS satellite, for example, on a display in the vehicle.

On the one hand, as the first related background art, the reception of the position measuring information to be transmitted from the above described positioning satellite is interrupted, for example, while the vehicle is moving in a tunnel or the like, so that it becomes impossible to calculate the above described measured position.

Therefore, according to the above described conventional positioning processing, if the position measuring information has been not obtained during a period which is longer than a predetermined threshold value (more specifically, for example, three seconds), assuming that accuracy of the above described estimated position during a period in which this position measuring information has been not obtained, a reset process has been performed in such a manner that an estimated position to be calculated on the basis of a current position before the interruption is ignored and the above described measured position to be obtained after the reception of the position measuring information restarts is defined as a current position of the movable body at the present time. Further, according to the conventional positioning processing, the above described threshold value comprises a predetermined value as a fixed value.

On the other hand, as the second related background art, when a position includes a plan position and an altitude of the movable body, according to the above described conventional positioning processing, in the case where degrees of accuracy of an estimated position and a positioning position are lowered, the reset processing has been performed in such a manner that the estimated position and the positioning position, which were calculated at precedence timing, are ignored and the estimated position just after obtained is defined as a current position of the movable body in that time.

Alternatively, it is assumed that the degrees of the accuracy of the above estimated position and the positioning position indicating timing, at which this reset processing starts, are detected to be lowered specifically when a difference between the altitude information calculated as the above estimated position (namely, the altitude information of a vehicle calculated only on the basis of the position measuring information) and the altitude information included in the above estimated information (namely, the estimated altitude information calculated as the estimated position) becomes not less than a predetermined threshold value. The present threshold value is defined as a higher value in some measure in association with an error to be principally included in the position measuring information.

However, according to the conventional positioning processing having the above described constitution of the first related background art, since the threshold value comprises a predetermined value as a fixed value, the following scopes for improvement have been occur.

In other words, at first, under the condition that the position measuring information having a low degree of accuracy is only obtained after the time shown by the threshold value has been passed, the positioning position having an extremely low degree of accuracy is identified as a current position. Accordingly, this involves a scope for improvement such that the accuracy of the current position also becomes extremely low.

Additionally, secondly, under the condition that the new position measuring information having a high degree of accuracy is obtained before the time shown by the threshold value has been passed, the above described positioning position is calculated in such a manner that the estimated position when the time shown by the threshold value has been passed is added to the positioning position on the basis of this position measuring information having a high degree of accuracy. Accordingly, this involves a scope for improvement such that, despite the positioning position having a high degree of accuracy has been obtained, only the current position having a degree of accuracy which is lower than that of the positioning position is calculated.

On the other hand, according to the conventional positioning processing having the above described constitution of the second related background art, the above threshold value comprises a fixed value and a high value in some measure, so that this involves a scope for improvement such that there is a case that the reset processing does not start when the need arises.

More specifically, for example, if the degrees of the accuracy of the estimated position and the positioning position are decreased, the reset processing on the basis of the difference in the altitude information does not start even when the positional error is obviously included in the current position of the vehicle which is displayed on the display. As a result, there is a case that the current positional error becomes larger.

SUMMARY OF THE INVENTION

Therefore, the present invention has been made taking the foregoing scopes for improvement into consideration, an object of which is to provide a positioning apparatus capable of calculating a current position at a higher degree of accuracy compared to a conventional case by the positioning position and the estimated position and a positioning method, and a navigation apparatus including the current positioning apparatus and a navigation method including the current positioning method.

The above object of the present invention can be achieved by a positioning apparatus. In one aspect of the present invention, there is provided a positioning apparatus which measures a current position of a movable body on the basis of a position information indicating a position of said movable body which was measured in the past by the use of a position measuring information transmitted from a positioning satellite. The positioning apparatus is provided with: a detecting device which detects a receiving condition of said position measuring information; a measuring device which ignores said position information which was obtained in the past when a precision of said position measuring information is decided to be deteriorated on the basis of a threshold value and measures said current position of said movable body by the use of said position measuring information which is received at the present time; and a control device which controls said threshold value on the basis of said detected receiving condition.

According to this aspect, the threshold value is controlled on the basis of the detected receiving condition of the position measuring information, so that it is possible to control whether the past position information is reflected on the current position information depending on the receiving condition of the current position measuring information, namely, its reliability or not. As a result, it is possible to measure the current position more precisely.

In another aspect of the positioning apparatus, said positioning apparatus further comprises a scaling device which measures a length of a period of time that the positioning by the use of said position measuring information has been impossible on the basis of said detected receiving condition; said measuring device ignores said position information which was obtained in the past when said measured length becomes not less than said threshold value and measures said current position of said movable body by the use of said position measuring information which is received at the present time.

According to this aspect, in the case of positioning the current position by the use of the position measuring information which is received at the present time by ignoring the previously obtained position information when the positioning by the use of the position measuring information only during time longer than the threshold value becomes impossible, the threshold value is controlled depending on the receiving condition of the position measuring information, so that it is possible to control whether the past position information is reflected on the current position information depending on the receiving condition of the current position measuring information, namely, its reliability or not. As a result, it is possible to measure the current position more precisely.

In further aspect of the positioning apparatus, said control device controls said threshold value when said receiving condition is deteriorated.

According to this aspect, when the receiving condition of the position measuring information is deteriorated, namely, when the reliability of the position measuring information is deteriorated, the threshold value is controlled, so that it is possible to measure the current position of the movable body more precisely.

In further aspect of the positioning apparatus, said detecting device, in said receiving condition, detects whether a influence of a multipath is received or not and; said control device controls said threshold value so as to be increased when said influence of said multipath is received.

According to this aspect, the threshold value is increased when receiving the influence by a multipath, so that it is possible to use the previous position information during longer time when the degree of accuracy of the position measuring information is low. As a result, it is possible to improve the degree of accuracy of the current position in the case where the degree of the accuracy of the position measuring information is low.

In further aspect of the positioning apparatus, said detecting device detects the first accuracy information which indicates a degree of accuracy of said position measuring information itself transmitted with being included in said position measuring information and the second accuracy information which indicates the measuring accuracy of the position on the basis of a spatial arrangement relation of a plurality of said positioning satellites; and said control device controls said threshold value to be decreased when the accuracy indicated by the first accuracy information is higher than a predetermined first threshold value and the accuracy indicated by the second accuracy information is higher than a predetermined second threshold value.

According to this aspect, the threshold value is decreased when the accuracy shown by the first accuracy information is higher than the first accuracy threshold and the accuracy shown by the second accuracy information is higher than the second accuracy threshold, so that a period of time that the previous position information has been used is shortened when the accuracy of the position measuring information is higher and the current position is measured by the use of the current position measuring information. As a result, it is possible to measure the current position with a high degree of accuracy in the case where the accuracy of the position measuring information is high.

In further aspect of the positioning apparatus, said positioning apparatus is provided with: an altitude information generating device which generates an altitude information indicating the altitude of said movable body by the use of said position measuring information; an altitude estimating device which estimates the altitude of said movable body at the present time from the past position information including a plan position and an altitude of said movable body measured in the past as said position information; said measuring device ignores said past position information when a difference between the altitude indicated by said altitude information and the estimated altitude becomes not less than said threshold value and measures a plan position and an altitude of said movable body at the present time by the use of said position measuring information which is received at the present time.

According to this aspect, in the case of measuring a present plan position and a present altitude by the use of the position measuring information which is received at the present time by ignoring the past position information when a difference between an altitude indicated by the positioning altitude information and the estimated altitude becomes not less than a threshold value, the threshold value is controlled depending on the receiving condition of the position measuring information, so that it is possible to control whether the previous position information is reflected on the current position information including the altitude depending on the receiving condition of the current position measuring information, namely, its reliability or not. As a result, it is possible to measure the present plan position and the present altitude more precisely.

In further aspect of the positioning apparatus, said detecting device, as said receiving condition, detects whether an influence of a multipath is received or not and an accuracy information indicating a degree of accuracy of said position measuring information itself which is transmitted with being included in said position measuring information; and said control device controls said threshold value so as to be decreased when said degree of accuracy indicated by said accuracy information is higher than a predetermined accuracy threshold value and said influence of said multipath is not received.

According to this aspect, the threshold value is decreased when the degree of the accuracy indicated by the accuracy information is high and the influence by a multipath is not received, so that a period of time that the past position information has been used is shortened when the degree of the accuracy of the position measuring information is high and a present plan position and a present altitude are measured by the use of the current position measuring information. As a result, it is possible to measure the present plan position and the present altitude with a higher degree of accuracy in the case where the degree of the accuracy of the position measuring information is high.

The above object of the present invention can be achieved by a navigation apparatus. In one aspect of the present invention, there is provided a navigation apparatus which measures a current position of a movable body on the basis of a position information indicating a position of said movable body which was measured in the past by the use of a position measuring information transmitted from a positioning satellite. The navigation apparatus is provided with: a detecting device which detects a receiving condition of said position measuring information; a scaling device which measures a length of a period of time that the positioning by the use of said position measuring information has been impossible on the basis of said detected receiving condition; a measuring device ignores said position information which was obtained in the past when said measured length becomes not less than a threshold value and measures said current position of said movable body by the use of said position measuring information which is received at the present time; a control device which controls said threshold value on the basis of said detected receiving condition; and a supporting device which supports the movement of said movable body on the basis of said measured position.

According to this invention, it is possible to measure the current position with a high degree of accuracy depending on the receiving condition of the position measuring information and support the movement of the vehicle.

In another aspect of the navigation apparatus is provided with: a detecting device which detects a receiving condition of said position measuring information; an altitude information generating device which generates an altitude information indicating the altitude of said movable body by the use of said position measuring information; an altitude estimating device which estimates the altitude of said movable body at the present time from the past position information including a plan position and an altitude of said movable body measured in the past as said position information; a measuring device which ignores said past position information when a difference between the altitude indicated by said altitude information and the estimated altitude becomes not less than a threshold value and measures a plan position and an altitude of said movable body at the present time by the use of said position measuring information which is received at the present time; a control device which controls said threshold value on the basis of said detected receiving condition; and a supporting device which supports the movement of the movable body on the basis of said measured position.

According to this invention, it is possible to measure the current position with a high degree of accuracy depending on the receiving condition of the position measuring information and support the movement of the vehicle.

The above object of the present invention can be achieved by a positioning method. In one aspect of the present invention, there is provided a positioning method of measuring a current position of a movable body on the basis of a position information indicating a position of said movable body which was measured in the past by the use of a position measuring information transmitted from a positioning satellite. The positioning method is provided with: a detecting process of detecting a receiving condition of said position measuring information; a measuring process of ignoring said position information which was obtained in the past when a precision of said position measuring information is decided to be deteriorated on the basis of a threshold value and measures said current position of said movable body by the use of said position measuring information which is received at the present time; and a controlling process of controlling said threshold value on the basis of said detected receiving condition.

According to this aspect, the threshold value is controlled on the basis of the detected receiving condition of the position measuring information, so that it is possible to control whether the past position information is reflected on the current position information depending on the receiving condition of the current position measuring information, namely, its reliability or not. As a result, it is possible to measure the current position more precisely.

In further aspect of the positioning method, said positioning method further comprises a scaling process of measuring a length of a period of time that the positioning by the use of said position measuring information has been impossible on the basis of said detected receiving condition; in said measuring process, said position information which was obtained in the past is ignored when said measured length becomes not less than said threshold value and said current position of said movable body is measured by the use of said position measuring information which is received at the present time.

According to this aspect, in the case of positioning the current position by the use of the position measuring information which is received at the present time by ignoring the previously obtained position information when the positioning by the use of the position measuring information only during time longer than the threshold value becomes impossible, the threshold value is controlled depending on the receiving condition of the position measuring information, so that it is possible to control whether the past position information is reflected on the current position information depending on the receiving condition of the current position measuring information, namely, its reliability or not. As a result, it is possible to measure the current position more precisely.

In further aspect of the positioning method, in said controlling process, said threshold value is controlled when said receiving condition is deteriorated.

According to this aspect, when the receiving condition of the position measuring information is deteriorated, namely, when the reliability of the position measuring information is deteriorated, the threshold value is controlled, so that it is possible to measure the current position of the movable body more precisely.

In further aspect of the positioning method, in said detecting process, in said receiving condition, whether a influence of a multipath is received or not is detected and; in said controlling process, said threshold value is controlled so as to be increased when said influence of said multipath is received.

According to this aspect, the threshold value is increased when receiving the influence by a multipath, so that it is possible to use the previous position information during longer time when the degree of accuracy of the position measuring information is low. As a result, it is possible to improve the degree of accuracy of the current position in the case where the degree of the accuracy of the position measuring information is low.

In further aspect of the positioning method, in said detecting process, the first accuracy information which indicates a degree of accuracy of said position measuring information itself transmitted with being included in said position measuring information and the second accuracy information which indicates the measuring accuracy of the position on the basis of a spatial arrangement relation of a plurality of said positioning satellites are detected; and in said controlling process, said threshold value is controlled to be decreased when the accuracy indicated by the first accuracy information is higher than a predetermined first threshold value and the accuracy indicated by the second accuracy information is higher than a predetermined second threshold value.

According to this aspect, the threshold value is decreased when the accuracy shown by the first accuracy information is higher than the first accuracy threshold and the accuracy shown by the second accuracy information is higher than the second accuracy threshold, so that a period of time that the previous position information has been used is shortened when the accuracy of the position measuring information is higher and the current position is measured by the use of the current position measuring information. As a result, it is possible to measure the current position with a high degree of accuracy in the case where the accuracy of the position measuring information is high.

In further aspect of the positioning method, said positioning method is provided with: an altitude information generating process of generating an altitude information indicating the altitude of said movable body by the use of said position measuring information; an altitude estimating process of estimating the altitude of said movable body at the present time from the past position information including a plan position and an altitude of said movable body measured in the past as said position information; in said measuring process, said past position information is ignored when a difference between the altitude indicated by said altitude information and the estimated altitude becomes not less than said threshold value and a plan position and an altitude of said movable body at the present time is measured by the use of said position measuring information which is received at the present time.

According to this aspect, in the case of measuring a present plan position and a present altitude by the use of the position measuring information which is received at the present time by ignoring the past position information when a difference between an altitude indicated by the positioning altitude information and the estimated altitude becomes not less than a threshold value, the threshold value is controlled depending on the receiving condition of the position measuring information, so that it is possible to control whether the previous position information is reflected on the current position information including the altitude depending on the receiving condition of the current position measuring information, namely, its reliability or not. As a result, it is possible to measure the present plan position and the present altitude more precisely.

In further aspect of the positioning method, in said detecting process, as said receiving condition, whether an influence of a multipath is received or not and an accuracy information indicating a degree of accuracy of said position measuring information itself which is transmitted with being included in said position measuring information are detected; and in said controlling process, said threshold value is controlled so as to be decreased when said degree of accuracy indicated by said accuracy information is higher than a predetermined accuracy threshold value and said influence of said multipath is not received.

According to this aspect, the threshold value is decreased when the degree of the accuracy indicated by the accuracy information is high and the influence by a multipath is not received, so that a period of time that the past position information has been used is shortened when the degree of the accuracy of the position measuring information is high and a present plan position and a present altitude are measured by the use of the current position measuring information. As a result, it is possible to measure the present plan position and the present altitude with a higher degree of accuracy in the case where the degree of the accuracy of the position measuring information is high.

The above object of the present invention can be achieved by a navigation method. In one aspect of the present invention, there is provided a navigation method of measuring a current position of a movable body on the basis of a position information indicating a position of said movable body which was measured in the past by the use of a position measuring information transmitted from a positioning satellite. The navigation method is provided with: a detecting process of detecting a receiving condition of said position measuring information; a scaling process of measuring a length of a period of time that the positioning by the use of said position measuring information has been impossible on the basis of said detected receiving condition; a measuring process of ignoring said position information which was obtained in the past when said measured length becomes not less than a threshold value and said current position of said movable body is measured by the use of said position measuring information which is received at the present time; a controlling process of controlling said threshold value on the basis of said detected receiving condition; and a supporting process of supporting the movement of said movable body on the basis of said measured position.

According to this invention, it is possible to measure the current position with a high degree of accuracy depending on the receiving condition of the position measuring information and support the movement of the vehicle.

In another aspect of the navigation method is provided with: a detecting process of detecting a receiving condition of said position measuring information; an altitude information generating process of generating an altitude information indicating the altitude of said movable body by the use of said position measuring information; an altitude estimating process of estimating the altitude of said movable body at the present time from the past position information including a plan position and an altitude of said movable body measured in the past as said position information; a measuring process of ignoring said position information which was obtained in the past when a difference between the altitude indicated by said altitude information and the estimated altitude becomes not less than a threshold value and a plan position and an altitude of said movable body at the present time is measured by the use of said position measuring information which is received at the present time; a controlling process of controlling said threshold value on the basis of said detected receiving condition; and a supporting process of supporting the movement of the movable body on the basis of said measured position.

According to this invention, it is possible to measure the current position with a high degree of accuracy depending on the receiving condition of the position measuring information and support the movement of the vehicle.

DESCRIPTION OF THE PREFERRED EMBODIMENTS

Next, the preferable embodiment according to the present invention will be described with reference to the drawings below.

The embodiment will be described below such that the present invention is applied to a navigation apparatus, which is mounted in a vehicle as a movable body, to measure the current position of the vehicle by the use of the GPS signal obtained by receiving the above described position measuring information and support the moving of the vehicle.

(I) An Embodiment of the Positioning Processing

In the first instance, before explaining a specific embodiment, the above described positioning processing as the premise of the present invention will be described in detail with reference to FIG. 1 and FIG. 2.

Figure 1:
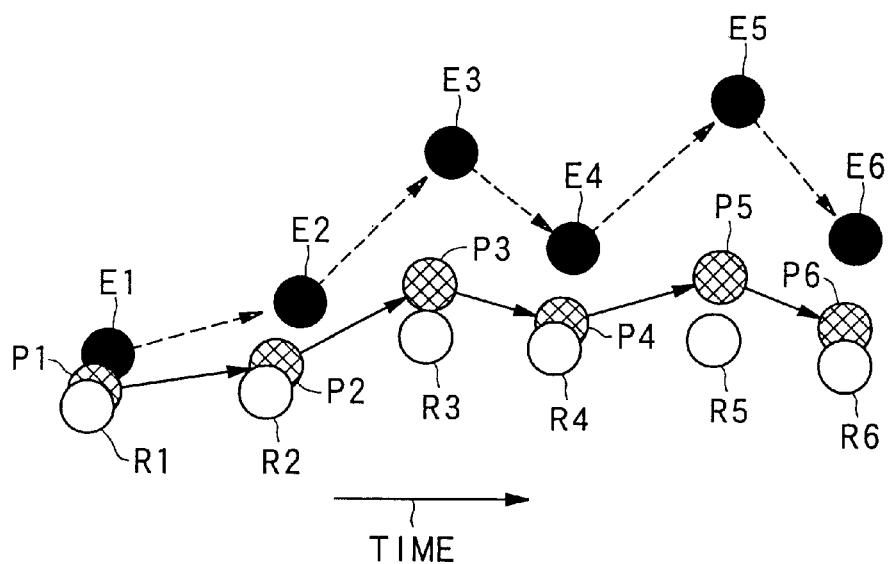
FIG. 1 is a typical view showing a principle of the current positioning processing as the premise of an embodiment according to the present invention.
Figure 2:
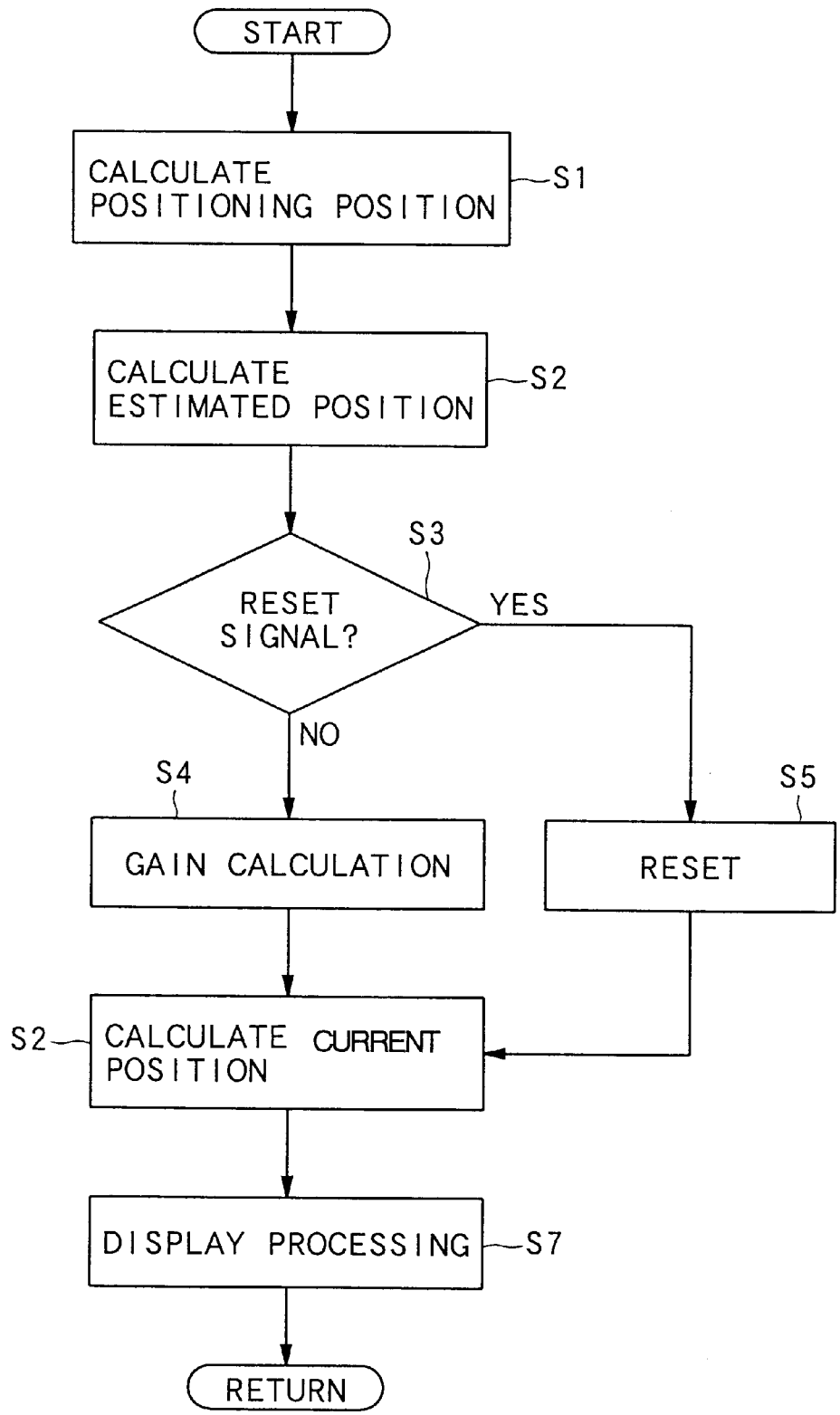
FIG. 2 is a flow chart showing the processing of the positioning processing as the premise of the embodiment according to the present invention.

FIG. 1 is a typical view showing a principle of the current positioning processing and FIG. 2 is a flow chart showing the specific processing in the current positioning processing. The processing shown by the flow chart in FIG. 2 is performed as a part of the navigation processing performed by the entirety of the navigation apparatus according to the embodiment.

As described above, according to the positioning processing as the premise of the present invention, a current position at the present time is calculated by using both of an estimated position at the present time which is obtained from the current position calculated by the former positioning processing on the base of a predetermined estimation method and a measured position at the present time which is calculated only by using the position measuring information received at the present time.

More specifically, a position obtained by dividing a line connecting the positioning position E3 and the estimated position R3 by the use of a gain (ratio) value as a positive actual number less than 1, which is experientially set in advance, is defined as a final current position (for example, in FIG. 1, a current position P3 among the current positions represented by reference numerals P1 to P6) on the basis of an estimated position (for example, an estimated position R3 among the estimated positions represented by reference numerals R1 to R6) which is obtained by adding a moving distance which is calculated by multiplying an average value of the speed information of the vehicle previously obtained by the use of the position measuring information transmitted from the GPS satellite and the speed information of the vehicle obtained in this time by the use of the position measuring information transmitted from the GPS satellite by the positioning spacing (namely, a difference between the time when the previous position measuring information was received and the time when the position measuring information is received in this time) to the previous positioning position (for example, a positioning position E2 among the positioning positions represented by reference numerals E1 to E6) as a vector and the positioning position (for example, an estimated position E3 in FIG. 1) which is calculated at the present time by the use of the above transmitted position measuring information. At the above positioning position E, a current position P is more precisely calculated by smoothing positioning tracks which are scattered in principle at the above positioning position E.

The above current position P is typically calculated by the following mathematical expression.

$$A \text{ current position } P = a \text{ gain value} \times a \text{ positioning position } E + (1 - a \text{ gain value}) \times an \text{ estimated position } R \qquad (1)$$

If the above gain value approaches "1", the current position P is calculated in the direction of the positioning position E. On the other hand, if the above gain value approaches "0", the current position P is calculated in the direction of the estimated position R. Then, considering various positioning conditions, this gain value is experientially set in advance.

Generally, the above gain value often becomes a value which approximates "0", so that the current position P is normally in the direction of the estimated position R. However, in the case where the reliability (the accuracy) of the estimated position R is low, the above reset process is performed in such a manner that the above gain value is defined as "1" so that the current position P is calculates preventing from being influenced by the past positioning position E and the pervious estimated position R.

A series of the positioning processing including the present rest process will be more specifically explained below. As shown in FIG. 2, according to the current positioning processing, at first, by the use of the received position measuring information, the positioning position E is calculated (step S1) and then, according to the above described method, the estimated position R is calculated (step S2).

As described above, if it is decided that the accuracy of the estimated position R is lowered and a rest signal indicating whether the reset process should be performed or not is generated by a method shown in FIG. 4 to be described later (step S3; YES), the above described reset process will be performed by defining the above gain value as "1" (step S5), the positioning position E obtained after performing the reset process is defined as the current position P (step S6) and a position in association with this current position P is displayed on the above display (step S7), so that the procedure will return to the original navigation possessing.

On the other hand, in the determination in the step S3, in the case where the reset signal is not generated (step S3; NO), assuming that the degree of the accuracy of the present estimated position R is high, the above gain value is set so as to be used for the calculation of the current position P as it is (step S4), the current position P is calculated by the processing shown in the above mathematical expression (1) (step S6) and the procedure shifts to the above step S7.

(II) The First Embodiment of the Present Invention

Next, the first embodiment according to the present invention premising the above described series of the positioning processing will be explained with reference to FIG. 3 and FIG. 4 below.

Figure 3:
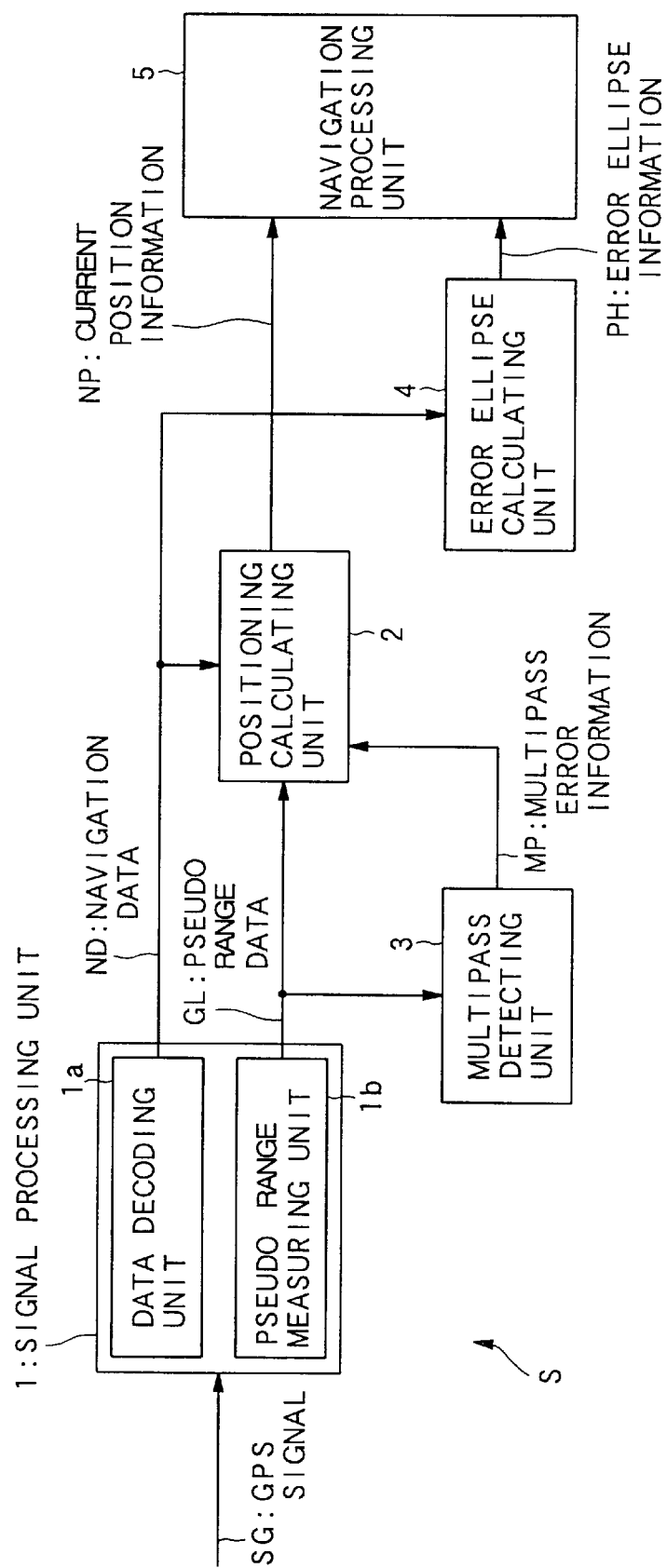
FIG. 3 is a block diagram for illustrating an entire construction of a navigation apparatus according to an embodiment of the present invention.
Figure 4:
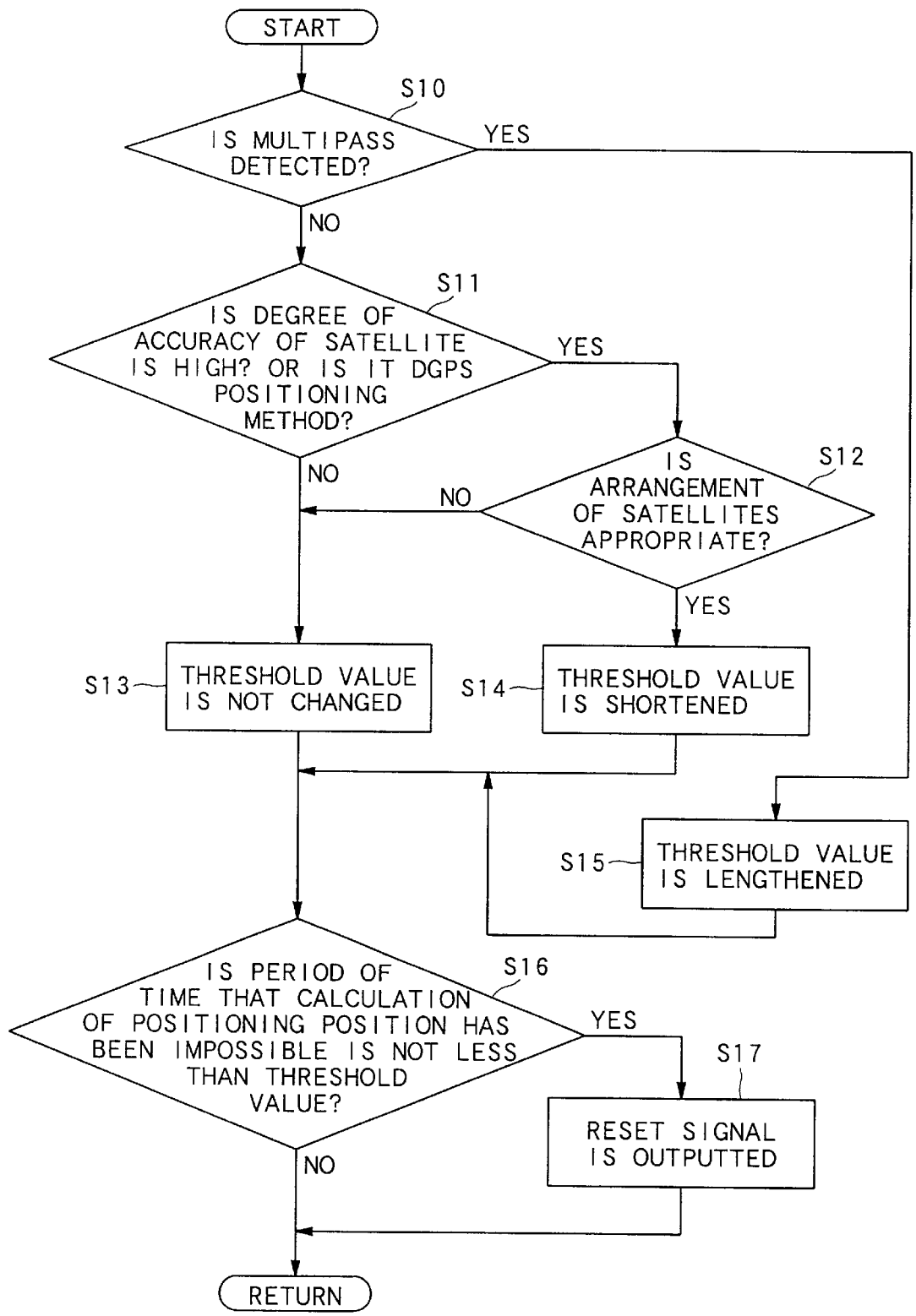
FIG. 4 is a flow chart showing the threshold value setting processing according to the first embodiment of the present invention.

FIG. 3 is a block diagram for illustrating an entire construction of a navigation apparatus according to the first embodiment and FIG. 4 is a flow chart showing the threshold value setting processing according to the first embodiment.

As shown in FIG. 3, a navigation apparatus S according to the first embodiment is constructed by a signal processing unit 1 as a detecting device which performs the signal processing of a GPS signal SG received from the above GPS satellite by a receiving unit (not illustrated) and generates the navigation data ND including the set accuracy information or the like to be described later and the pseudo range data GL which indicates the pseudo range from the navigation apparatus S to each GPS satellite, a positioning calculating unit 2 as a scaling device, a measuring device and a control device, which generates the current position information NP indicating the current position P of the vehicle by performing the processing according to the embodiment (refer to FIG. 4) on the basis of the above navigation data ND, the pseudo range data GL and the multipath error information MP to be described later, a multipath detecting unit 3 which generates the above multipath error information MP indicating the measuring error due to the present multipath and outputs it to the positioning calculating unit 2, an error ellipse calculating unit 4 which calculates so-caller ellipse on the basis of the above navigation data ND and generates the error ellipse information PH indicating a position of the present error ellipse and the corresponding area and a navigation processing unit 5 which calculates the current position of the vehicle on the basis of the above current position information NP and the error ellipse information PH as well as performs the necessary navigation processing by using the calculated current position of the vehicle.

Alternatively, the signal processing unit 1 is constructed by a data decoding unit 1a which generates the above navigation data ND by the use of each GPS signal SG transmitted from a plurality of GPS satellites and a pseudo range measuring unit 1b which generates the above pseudo range data GL by measuring the distance error up to each GPS satellite.

The above multipath detecting unit 3 decides whether the above each GPS signal SG receives the influence of the multipath or not on the basis of the above inputted each pseudo range data GL.

The multipath detecting processing is performed by the use of a fact that the pseudo range is continuously changed to some extent. Specifically, the estimated value of the pseudo range data GL in this time for each GPS satellite is calculated from the former current position P or the pseudo range data GL for each GPS satellite which is used for the former positioning. Then, comparing the difference between this estimated value and the pseudo range data GL for each GPS satellite which is inputted at the present time, if it is decided that this difference is not less than a reference value which is decided in advance, it is judged that the multipath is generated.

Then, when it is judged that the multipath is generated, the influence by this multipath is calculated as the above multipath error information MP and the calculated multipath error information MP is outputted to the positioning calculating unit 2.

After judging that the multipath is generated, it is judged that the influence by the multipath is erased when the influence by the multipath is erased in actual and then, this condition has been continued for predetermined time.

Next, the processing according to the first embodiment in the above positioning calculating unit 2 will be explained with reference to FIG. 4.

Alternatively, as described above, the positioning calculating unit 2 generates the current position information NP indicating the current position P of the vehicle on the basis of the above navigation method data ND, the pseudo range data GL and the multipath error information MP. In this time, the current position P is calculated by the positioning processing which is indicated in the above described FIG. 1 and FIG. 2 and the above reset signal to be used for the positioning processing is generated by the processing shown in FIG. 4.

In other words, as shown in FIG. 4, in the reset signal generating processing according to the embodiment, it is checked whether the multipath is generated at the present time or not on the basis of the above multipath error information MP (step S10).

Then, if it is judged that the degree of the accuracy of the positioning position E is lowered by the above GPS signal SG from the generation of the multipath (step S10; YES), a threshold value in association with the positioning impossible time to be described later is set to be longer than the earlier value (step S15) and the procedure shifts to step S16.

On one hand, when the multipath is not generated in the decision of the step S10 (step S10; NO), then, it is decided whether the degree of the accuracy of the GPS signal SG itself is higher or not or whether the movable body is moving or not at the present time by DGPS (Differential Global Positioning System) positioning method (step S11).

It is decided whether the degree of the accuracy of the GPS signal SG itself is higher or not on the basis of the satellite accuracy information included in the above navigation method data ND itself.

On one hand, a DGPS positioning method serves to measure a current position of a vehicle according to a constitution such that the position measuring information from the GPS satellite is once received at a reference station on the earth and a modified GPS signal of which positioning error included therein is modified is freshly transmitted to the vehicle. It is judged whether the present modified GPS signal is received or not at the receiving unit (not illustrated). If its judging result is inputted in the positioning calculating unit 2, it is decided whether the present DGPS positioning method is used at the present time or not.

Then, in the decision of the step S11, when the degree of the accuracy of the GPS signal SG itself is low and the current position is not detected by the DGPS positioning method (step S11; NO), the above threshold value is not changed and it remains as set at the present time and the procedure shifts to step S16.

On the other hand, when the degree of the accuracy of the GPS signal SG itself is high or the current position is detected by the DGPS positioning method (step S11; YES), then, it is decided whether the spatial arrangement of the GPS satellites transmitting a plurality of GPS signals SG which are received at the present time serves to improve the degree of the accuracy of the current position P or not (step S12).

According to the step S12, the present decision is specifically carried out by the use of a transmitted accuracy coefficient (generally, a coefficient referred to as DOP (Dilution of Precision)), of which content is set by the arrangement of the GPS satellite itself.

Alternatively, if the spatial arrangement of the GPS satellites serves to improve the degree of the accuracy in the detection of the current position (step S12; YES), the above threshold value is shortened so as to shorten spacing in calculating the current position P by the use of the above positioning position E which is estimated to have the high degree of the accuracy (step S14) and the procedure shifts to next step S16.

Alternatively, in the decision of the step S12, if the spatial arrangement of the GPS satellites does not serve to improve the degree of the accuracy in the detection of the current position (step S12; NO), the procedure shifts to the above step S13 as it is.

When the threshold value is set by the above described series of the processing (steps S13, S14 and S15), the position measuring information is not received from the above GPS satellite, so that it is decided whether the positioning impossible time as a period of time that the calculation of the above positioning position E has been impossible is not less than the above set threshold value or not (step S16). Then, if it is decided that the positioning impossible time is not less than the threshold value (step S16; YES), the above reset signal is generated and the processing to make the above positioning position E into the current position P is performed (step S17, refer to the steps S3 and S5 in FIG. 2) and the procedure returns to the original navigation processing.

On one hand, when the positioning impossible time is less than the present threshold value in the decision in the step S16 (step S16; NO), it is not necessary to perform the above reset processing, so that the procedure shifts to the original navigation processing as it is.

As described above, according to the processing in the positioning calculating unit 2 of the first embodiment, in the case of ignoring the positioning position E and the estimated position R which were obtained in the past when the positioning by the use of the position measuring information becomes impossible only during the time not less than the above threshold value and measuring the current position P by the use of the position measuring information which is received at the present time, the present threshold value is controlled in association with the receiving condition of the position measuring information. Therefore, it is possible to control whether the past positioning position E and the past estimated position R are reflected on the current position P in association with the receiving condition of the position measuring information at the present time, namely, its reliability, so that it is possible to support the moving of the vehicle by measuring the current position P more precisely.

Alternatively, when the receiving condition of the position measuring information is deteriorated, namely, when the reliability of the position measuring information is lowered, the threshold value is controlled, so that it is possible to measure the current position P of the vehicle more precisely.

Further, the threshold value is increased when the multipath is generated, so that it is possible to use the past positioning position E and the past estimated position R longer when the degree of the accuracy of the position measuring information is low. As a result, it is possible to improve the degree of the accuracy of the current position P in the case where the degree of the accuracy of the position measuring information is low.

Further, the threshold value is decreased when the degree of the accuracy of the GPS signal SG itself is high or the current position is detected by the DGPS positioning method and the spatial arrangement of the GPS satellites serves to improve the degree of the accuracy of the detection of the current position. Therefore, when the degree of the accuracy of the position measuring information is high, the time period during the past positioning position E and the past estimated position R are used is shortened and the current position P is measured by the use of the current positioning position E, so that it is possible to measure the current position P with a higher degree of the accuracy than the case that the degree of the accuracy of the positioning position is high.

(III) The Second Embodiment of the Present Invention

Next, the second embodiment according to the present invention premising the above described series of the positioning processing will be explained with reference to FIG. 5 below.

Figure 5:
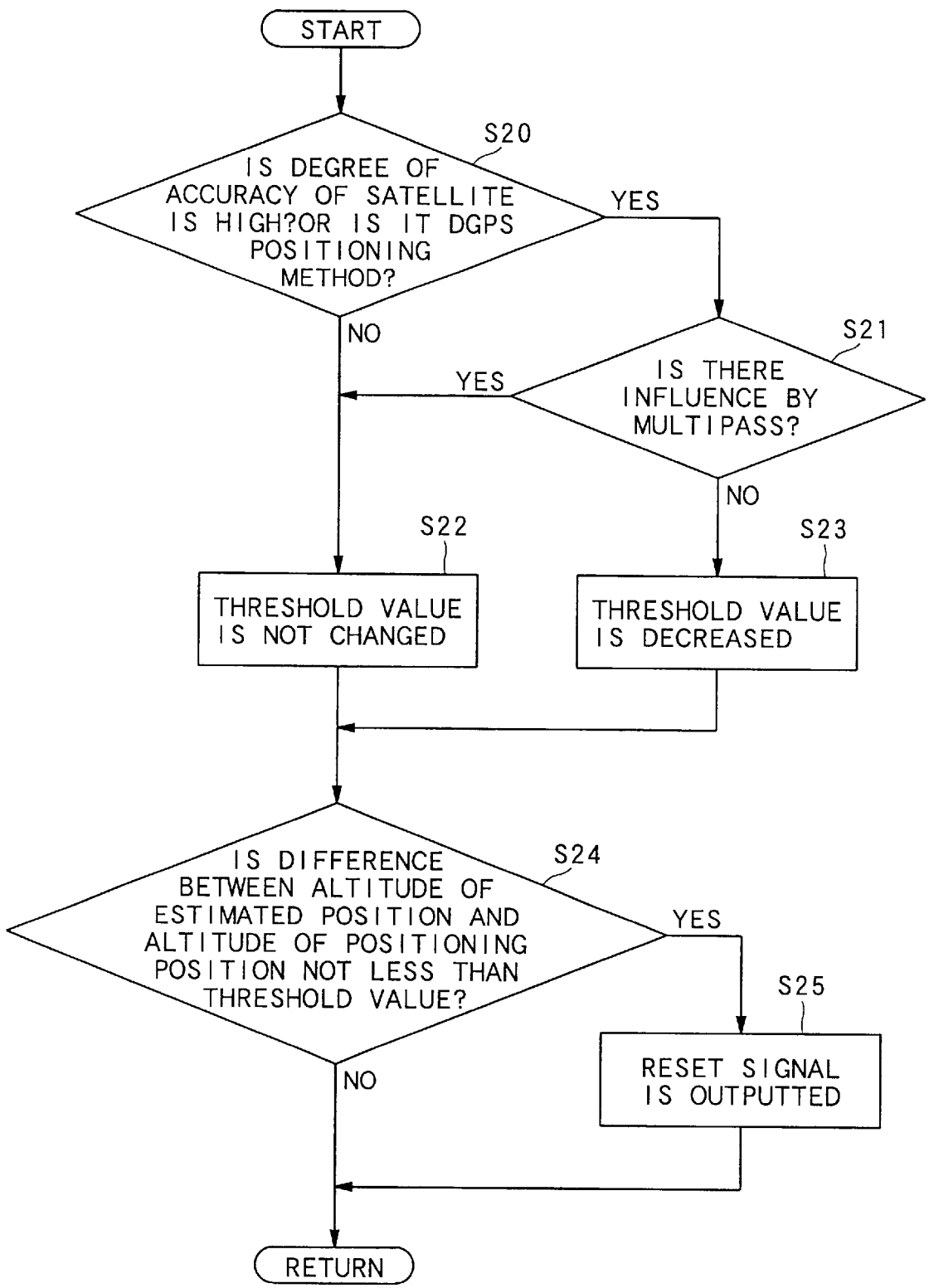
FIG. 5 is a flow chart showing the threshold value setting processing according to the second embodiment of the present invention.

FIG. 5 is a flow chart showing the threshold value setting processing according to the second embodiment.

Further, the construction of the navigation apparatus that carry out the positioning processing according to the second embodiment is completely same as that of the navigation apparatus S according to the first embodiment, so that the explanation of the detail of the construction of that navigation apparatus is omitted.

As described above, in the first embodiment, in the case of ignoring the positioning position E and the estimated position R which were obtained in the past when the positioning by the use of the position measuring information becomes impossible only during the time not less than the above threshold value and measuring the current position P by the use of the position measuring information which is received at the present time, the present threshold value is controlled in association with the receiving condition of the position measuring information. On the other hand, in the second embodiment described below, in the case of measuring a present plan position and a present altitude by the use of the positioning information which is received at the present time by ignoring the past positioning position E and the past estimated position R when a difference between an altitude indicated by the altitude information as the positioning position E and an altitude indicated by the altitude information as the estimated position R becomes not less than a set threshold value, the present threshold value is controlled depending on the receiving condition of the positioning information.

In other words, as shown in FIG. 5, according to the reset signal generating processing of the embodiment, at first, it is decided whether the degree of the accuracy of the GPS signal SG itself is high or not or the movable body is moving at the present time by DGPS positioning method or not (step S20).

It is decided whether the degree of the accuracy of the GPS signal SG itself is higher or not, in the same way as the first embodiment, on the basis of the satellite accuracy information included in the above navigation method data ND itself.

Alternatively, when the degree of the accuracy of the GPS signal SG itself is low and the current position is not detected by the DGPS positioning method in the decision of the step S20 (step S20; NO), the above threshold value is not changed and it remains as set at the present time (step S22) and the procedure shifts to step S24

On the other hand, in the decision of the step S20, when the degree of the accuracy of the GPS signal SG itself is high or the current position is detected by the DGPS positioning method (step S20; YES), then, it is checked whether the multipath is generated at the present time or not on the basis of the above multipath error information MP (step S21).

Then, if it is judged that the degree of the accuracy of the positioning position E indicated by the above GPS signal SG is decreased since the influence by the multipath is received (step S21; YES), the procedure shifts to the step S22. On the other hand, if the multipath is not generated (step S21; NO), the above threshold value is decreased so that the current position P is calculated by the use of the positioning position E which is estimated to have a higher degree of accuracy as a position (step S23) and then, the procedure shifts to next step S24.

If a threshold value is set by the above described series of the processing (step S22 and step S23), then, it is decided whether a difference between an altitude indicated by the altitude information as the positioning position E which is calculated on the basis of the above positioning information and an altitude indicated by the altitude information calculated as the above estimated position R is not less than this set threshold value or not (step S24). If it is not less than the threshold value (step 24; YES), the above reset signal is generated and the processing for defining the above positioning position E as the current position P is performed (step S25; refer to the above step S3 and the step S5 in FIG. 2) and the procedure returns to the original navigation processing.

On one hand, according to the decision in the step S24, when the difference in the altitude is less than the threshold value (step S24; NO), the procedure shifts to the original navigation processing as it is since the above reset processing is not necessary.

As described above, according to the processing by a positioning calculating unit 2 of the embodiment, in the case of measuring a present plan position and a present altitude by the use of the positioning information which is received at the present time by ignoring the past positioning position E and the past estimated position R when a difference between an altitude indicated by the altitude information as the positioning position E and an altitude indicated by the altitude information as the estimated position R becomes not less than a set threshold value, the present threshold value is controlled depending on the receiving condition of the positioning information, so that it is possible to control whether the past positioning information is reflected on the positioning information including the past positioning position E and the past estimated position R depending on the receiving condition of the current positioning information, namely, its reliability or not. As a result, it is possible to measure the present plan position and the present altitude more precisely so as to support the moving of the vehicle.

Alternatively, the threshold value is decreased when the degree of the accuracy of the positioning position E is high and the influence by a multipath is not received, so that a period of time that the past positioning position E and the past estimated position R have been used is shortened when the degree of the accuracy of the positioning information is high and a present plan position and a present altitude are measured by the use of the current positioning information. As a result, it is possible to measure the present plan position and the present altitude with a higher degree of accuracy in the case where the degree of the accuracy of the positioning information is high.

Alternatively, according to the above described embodiment, a case is described such that the present invention is applied for detecting the current position P in the case of moving the vehicle. However, in addition to this case, the present embodiment is widely capable of being applied to a case such that the current position P of a movable body (including a person who has a portable navigation apparatus S) is detected by the use of the position measuring information from the above GPS satellite.

According to the above described embodiment, a case is described such that the reset process is always performed when the above reset signal is generated. However, in addition to this case, the present embodiment is constituted in such a manner that the reset process is not always performed when the present reset signal is generated and it is judged whether the reset process is performed in actual or not considering the generation of the present reset signal as one of the judgement materials and also considering other elements.

Further, the programs in association with the flow charts shown in FIG. 2 and FIG. 4 or FIG. 5 are stored in, for example, a flexible disk, a hard disk or a semiconductor memory or the like. Then, if the programs are read out by a general-purpose microcomputer or the like to be executed, it is also possible to constitute the present microcomputer or the like so as to function as the positioning calculating unit 2 according to the embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-142491 and No. 2001-142492 both filed on May 11, 2001 including the specification, claims, drawings and summary is incorporated herein by reference in its entirety.

What is claimed is:

1. A positioning apparatus which measures a current position of a movable body on the basis of a position information indicating a position of said movable body which was measured in the past by the use of a position measuring information transmitted from a positioning satellite, comprising:

a detecting device which detects a receiving condition of said position measuring information;

a measuring device which ignores said position information which was obtained in the past when a precision of said position measuring information is decided to be deteriorated on the basis of a threshold value and measures said current position of said movable body by the use of said position measuring information which is received at the present time; and a control device which controls said threshold value on the basis of said detected receiving condition.

2. A positioning apparatus according to claim 1, wherein said positioning apparatus further comprises a scaling device which measures a length of a period of time that the positioning by the use of said position measuring information has been impossible on the basis of said detected receiving condition, said measuring device ignores said position information which was obtained in the past when said measured length becomes not less than said threshold value and measures said current position of said movable body by the use of said position measuring information which is received at the present time.

3. A positioning apparatus according to claim 2, wherein said control device controls said threshold value when said receiving condition is deteriorated.

4. A positioning apparatus according to claim 3, wherein said detecting device, in said receiving condition, detects whether a influence of a multipath is received or not, and said control device controls said threshold value so as to be increased when said influence of said multipath is received.

5. A positioning apparatus according to claim 2, wherein said detecting device detects the first accuracy information which indicates a degree of accuracy of said position measuring information itself transmitted with being included in said position measuring information and the second accuracy information which indicates the measuring accuracy of the position on the basis of a spatial arrangement relation of a plurality of said positioning satellites, and said control device controls said threshold value to be decreased when the accuracy indicated by the first accuracy information is higher than a predetermined first threshold value and the accuracy indicated by the second accuracy information is higher than a predetermined second threshold value.

6. A positioning apparatus according to claim 1, wherein said positioning apparatus further comprises:

an altitude information generating device which generates an altitude information indicating the altitude of said movable body by the use of said position measuring information;

an altitude estimating device which estimates the altitude of said movable body at the present time from the past position information including a plan position and an altitude of said movable body measured in the past as said position information, and said measuring device ignores said past position information when a difference between the altitude indicated by said altitude information and the estimated altitude becomes not less than said threshold value and measures a plan position and an altitude of said movable body at the present time by the use of said position measuring information which is received at the present time.

7. A positioning apparatus according to claim 6, wherein said detecting device, as said receiving condition, detects whether an influence of a multipath is received or not and an accuracy information indicating a degree of accuracy of said position measuring information itself which is transmitted with being included in said position measuring information, and said control device controls said threshold value so as to be decreased when said degree of accuracy indicated by said accuracy information is higher than a predetermined accuracy threshold value and said influence of said multipath is not received.

8. A navigation apparatus which measures a current position of a movable body on the basis of a position information indicating a position of said movable body which was measured in the past by the use of a position measuring information transmitted from a positioning satellite, comprising:

a detecting device which detects a receiving condition of said position measuring information;

a scaling device which measures a length of a period of time that the positioning by the use of said position measuring information has been impossible on the basis of said detected receiving condition;

a measuring device ignores said position information which was obtained in the past when said measured length becomes not less than a threshold value and measures said current position of said movable body by the use of said position measuring information which is received at the present time;

a control device which controls said threshold value on the basis of said detected receiving condition; and a supporting device which supports the movement of said movable body on the basis of said measured position.

9. A navigation apparatus which measures a current position of a movable body on the basis of a position information indicating a position of said movable body which was measured in the past by the use of a position measuring information transmitted from a positioning satellite, comprising:

a detecting device which detects a receiving condition of said position measuring information;

an altitude information generating device which generates an altitude information indicating the altitude of said movable body by the use of said position measuring information;

an altitude estimating device which estimates the altitude of said movable body at the present time from the past position information including a plan position and an altitude of said movable body measured in the past as said position information;

a measuring device which ignores said past position information when a difference between the altitude indicated by said altitude information and the estimated altitude becomes not less than a threshold value and measures a plan position and an altitude of said movable body at the present time by the use of said position measuring information which is received at the present time;

a control device which controls said threshold value on the basis of said detected receiving condition; and a supporting device which supports the movement of the movable body on the basis of said measured position.

10. A positioning method of measuring a current position of a movable body on the basis of a position information indicating a position of said movable body which was measured in the past by the use of a position measuring information transmitted from a positioning satellite, comprising:

a detecting process of detecting a receiving condition of said position measuring information;

a measuring process of ignoring said position information which was obtained in the past when a precision of said position measuring information is decided to be deteriorated on the basis of a threshold value and measures said current position of said movable body by the use of said position measuring information which is received at the present time; and a controlling process of controlling said threshold value on the basis of said detected receiving condition.

11. A positioning method according to claim 10, wherein said positioning method further comprises a scaling process of measuring a length of a period of time that the positioning by the use of said position measuring information has been impossible on the basis of said detected receiving condition, and in said measuring process, said position information which was obtained in the past is ignored when said measured length becomes not less than said threshold value and said current position of said movable body is measured by the use of said position measuring information which is received at the present time.

12. A positioning method according to claim 11, wherein, in said controlling process, said threshold value is controlled when said receiving condition is deteriorated.

13. A positioning method according to claim 12, wherein, in said detecting process, in said receiving condition, whether a influence of a multipath is received or not is detected and;

in said controlling process, said threshold value is controlled so as to be increased when said influence of said multipath is received.

14. A positioning method according to claim 11, wherein, in said detecting process, the first accuracy information which indicates a degree of accuracy of said position measuring information itself transmitted with being included in said position measuring information and the second accuracy information which indicates the measuring accuracy of the position on the basis of a spatial arrangement relation of a plurality of said positioning satellites are detected, and in said controlling process, said threshold value is controlled to be decreased when the accuracy indicated by the first accuracy information is higher than a predetermined first threshold value and the accuracy indicated by the second accuracy information is higher than a predetermined second threshold value.

15. A positioning method according to claim 10, wherein said positioning method further comprises:

an altitude information generating process of generating an altitude information indicating the altitude of said movable body by the use of said position measuring information;

an altitude estimating process of estimating the altitude of said movable body at the present time from the past position information including a plan position and an altitude of said movable body measured in the past as said position information, and, in said measuring process, said past position information is ignored when a difference between the altitude indicated by said altitude information and the estimated altitude becomes not less than said threshold value and a plan position and an altitude of said movable body at the present time is measured by the use of said position measuring information which is received at the present time.

16. A positioning method according to claim 15, wherein, in said detecting process, as said receiving condition, whether an influence of a multipath is received or not and an accuracy information indicating a degree of accuracy of said position measuring information itself which is transmitted with being included in said position measuring information are detected, and in said controlling process, said threshold value is controlled so as to be decreased when said degree of accuracy indicated by said accuracy information is higher than a predetermined accuracy threshold value and said influence of said multipath is not received.

17. A navigation method of measuring a current position of a movable body on the basis of a position information indicating a position of said movable body which was measured in the past by the use of a position measuring information transmitted from a positioning satellite; comprising:

a detecting process of detecting a receiving condition of said position measuring information;

a scaling process of measuring a length of a period of time that the positioning by the use of said position measuring information has been impossible on the basis of said detected receiving condition;

a measuring process of ignoring said position information which was obtained in the past when said measured length becomes not less than a threshold value and said current position of said movable body is measured by the use of said position measuring information which is received at the present time;

a controlling process of controlling said threshold value on the basis of said detected receiving condition; and a supporting process of supporting the movement of said movable body on the basis of said measured position.

18. A navigation method of measuring a current position of a movable body on the basis of a position information indicating a position of said movable body which was measured in the past by the use of a position measuring information transmitted from a positioning satellite, comprising:

a detecting process of detecting a receiving condition of said position measuring information;

an altitude information generating process of generating an altitude information indicating the altitude of said movable body by the use of said position measuring information;

an altitude estimating process of estimating the altitude of said movable body at the present time from the past position information including a plan position and an altitude of said movable body measured in the past as said position information;

a measuring process of ignoring said position information which was obtained in the past when a difference between the altitude indicated by said altitude information and the estimated altitude becomes not less than a threshold value and a plan position and an altitude of said movable body at the present time is measured by the use of said position measuring information which is received at the present time;

a controlling process of controlling said threshold value on the basis of said detected receiving condition; and a supporting process of supporting the movement of the movable body on the basis of said measured position.

* * * * *